US011530718B1

(12) United States Patent
Bendorf

(10) Patent No.: US 11,530,718 B1
(45) Date of Patent: Dec. 20, 2022

(54) JOINT PRESS

(71) Applicant: Snap-on Incorporated, Kenosha, WI (US)

(72) Inventor: Scott A. Bendorf, Kenosha, WI (US)

(73) Assignee: Snap-on Incorporated, Kenosha, WI (US)

(*) Notice: Subject to any disclaimer, the term of this patent is extended or adjusted under 35 U.S.C. 154(b) by 0 days.

(21) Appl. No.: 17/502,796

(22) Filed: Oct. 15, 2021

(51) Int. Cl.
*B25B 27/00* (2006.01)
*B60G 7/00* (2006.01)
*B25B 27/02* (2006.01)
*F16C 11/06* (2006.01)

(52) U.S. Cl.
CPC ...... *F16C 11/0685* (2013.01); *B25B 27/0035* (2013.01); *B25B 27/023* (2013.01); *B60G 7/005* (2013.01); *B60G 2204/416* (2013.01); *B60G 2206/92* (2013.01)

(58) Field of Classification Search
CPC . B25B 27/0035; B25B 27/023; F16C 11/0685
USPC ......................................................... 29/239
See application file for complete search history.

(56) References Cited

U.S. PATENT DOCUMENTS

| | | | | |
|---|---|---|---|---|
| 2,507,003 A | * | 5/1950 | Gagne | B25B 27/026 29/283 |
| 3,599,311 A | * | 8/1971 | Ellis | B25B 27/023 29/259 |
| 3,745,637 A | | 7/1973 | Rutherford et al. | |
| 4,771,528 A | * | 9/1988 | Stromberg | B25B 27/023 29/259 |
| 5,129,133 A | * | 7/1992 | Reesor | B25B 27/026 29/252 |
| 7,818,860 B2 | | 10/2010 | Hume et al. | |
| 2017/0100825 A1 | * | 4/2017 | Zeren | B25B 27/28 |
| 2019/0375081 A1 | | 12/2019 | Schley et al. | |

FOREIGN PATENT DOCUMENTS

| | | |
|---|---|---|
| EP | 1733846 A2 | 12/2006 |
| EP | 2025474 A2 | 2/2009 |
| KR | 100227364 B1 | 11/1999 |
| KR | 200161999 Y1 | 12/1999 |
| TW | I491478 B | 7/2015 |

* cited by examiner

*Primary Examiner* — Lee D Wilson
*Assistant Examiner* — Jonathan G Santiago Martinez
(74) *Attorney, Agent, or Firm* — Seyfarth Shaw LLP

(57) ABSTRACT

A ball joint press for installation/removal of ball joints or bushings into/from suspension components of vehicles. In general, the press includes first and second frame portions, a spine/shaft coupling the first and second frame portions together, and actuators coupled to one of the first and second frame portions. The actuators are sized and spaced such that combined forces of the actuators minimize a bending moment (and bending stress) about the shaft. The actuators may also share a feed line that provides for equal pressure across both actuators. This reduces an axis of bending of the shaft, and causes the first and second frame portions to remain substantially parallel and the force in line with an axis of motion to install or remove the ball joint.

21 Claims, 15 Drawing Sheets

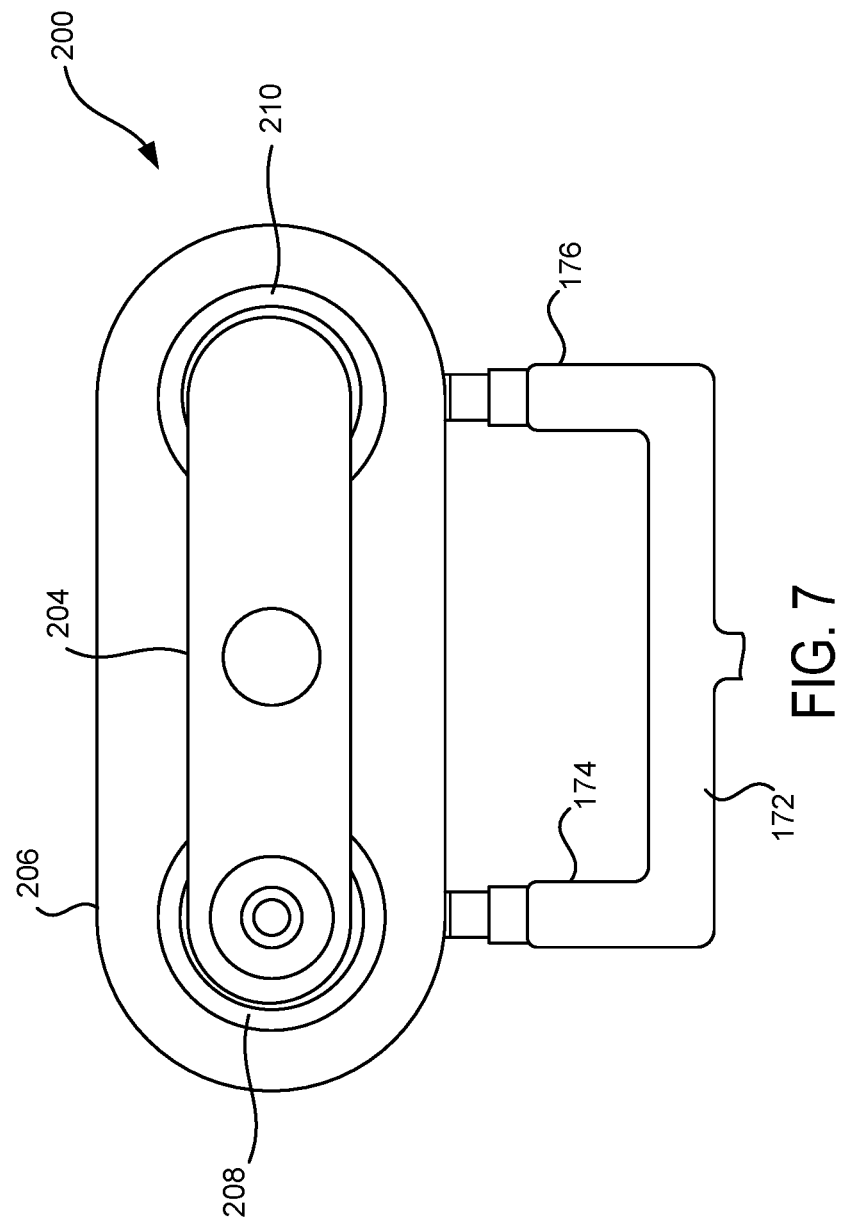

JOINT PRESS

TECHNICAL FIELD

The present application relates generally to joint press devices, and more particularly to a ball joint press for removal of ball joints or bushings from suspension components of vehicles.

BACKGROUND

Removal and installation of ball joints from suspension components of vehicles generally requires the application of high force. Joint press kits are used to install and remove press-fit joints, such as press-fit ball joints and universal joints of vehicle suspensions. A joint press kit often includes several adapters for differently sized ball joints, and most function on the same basic principle to press a ball joint.

In general, a "C" shaped frame or yoke is used to contain the assembly, force is applied to the ball joint through an adapter on one side (usually via a pressure screw or hydraulic unit), while bracing on the opposite side with a receiver cup that the ball joint fits into. The ball joint is pressed into or through a control arm or steering knuckle.

For example, the adapters typically fall into two categories: 1) "push" adapters bear against joints to drive them in a particular direction, e.g. into or out of a vehicle suspension; and 2) "receiver" adapters bear against the vehicle suspension and receive a joint as it is pushed. Thus, the push adapter and receive adapter cooperate to force the joint either into or out of a vehicle suspension or steering knuckle. However, the frame or yoke of conventional joint press can experience unwanted bending stresses, due to the high amount of force needed to install and/or remove ball joints.

SUMMARY

The present invention relates broadly to a ball joint press for removal/installation of ball joints or bushings from/into suspension components of vehicles. In general, the press includes first and second frame portions, a spine/shaft coupling the first and second frame portions together, and actuators coupled to one of the first and second frame portions. The actuators are sized and spaced such that combined forces of the actuators minimize a bending moment (and bending stress) about the shaft. The actuators may also share a feed line that provides equalized pressure across both actuators. By equalizing forces and pressure, the shaft is loaded in tension. This also reduces an axis of bending of the shaft, and causes the first and second frame portions to remain substantially parallel and the force in line with an axis of motion to install or remove the ball joint.

In an embodiment, the joint press includes a shaft having opposing first and second end portions. A first frame portion is coupled to the first end portion, and includes an adapter coupling aperture adapted to couple to a first adapter. A second frame portion is coupled to the second end portion. First and second actuators are coupled to the second frame portion, and are disposed an equal distance away from the shaft. The first and second actuators respectively include first and second actuator shafts, and the first actuator shaft is adapted to couple to a second adapter and is linearly aligned with the adapter coupling aperture.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 7 is a first end view of the joint press of FIG. 6 with actuators coupled to a feed line, according to an embodiment of the present invention.

DETAILED DESCRIPTION

Figure 1A:
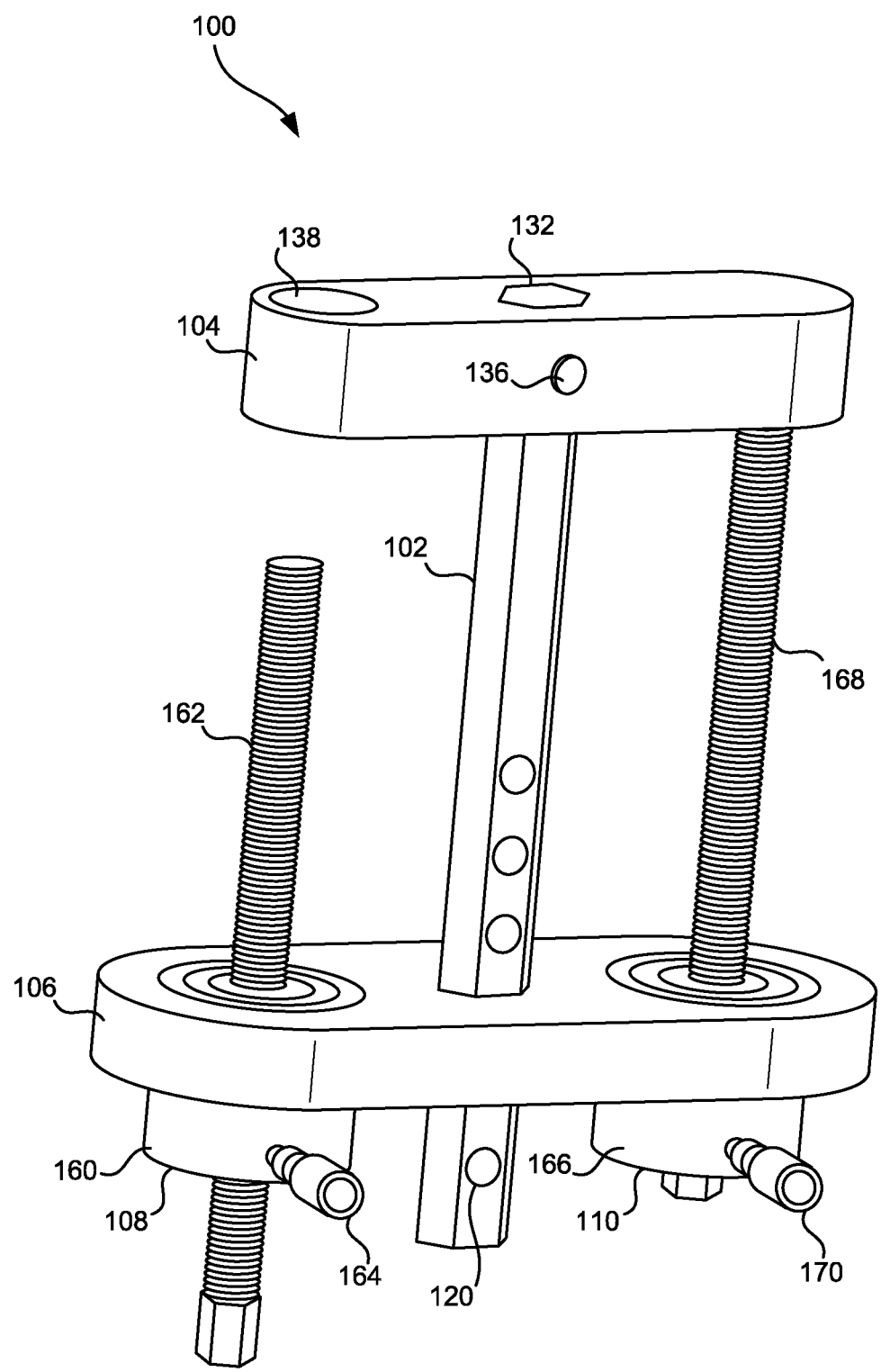
FIG. 1A is a perspective view of a joint press, according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to a ball joint press for removal and/or installation of ball joints or bushings from and/or into suspension components of vehicles. In general, the press includes first and second frame portions, a spine/shaft coupling the first and second frame portions together, and actuators coupled to one of the first and second frame portions. The actuators are sized and spaced such that combined forces of the actuators minimize a bending moment (and bending stress) about the shaft. The actuators may also share a feed line that provides substantially equal pressure across both actuators. By equalizing forces and pressure, the shaft is loaded in tension. This also reduces an axis of bending of the shaft, and causes the first and second frame portions to remain substantially parallel and the force in line with an axis of motion to install or remove the ball joint.

Figure 1B:
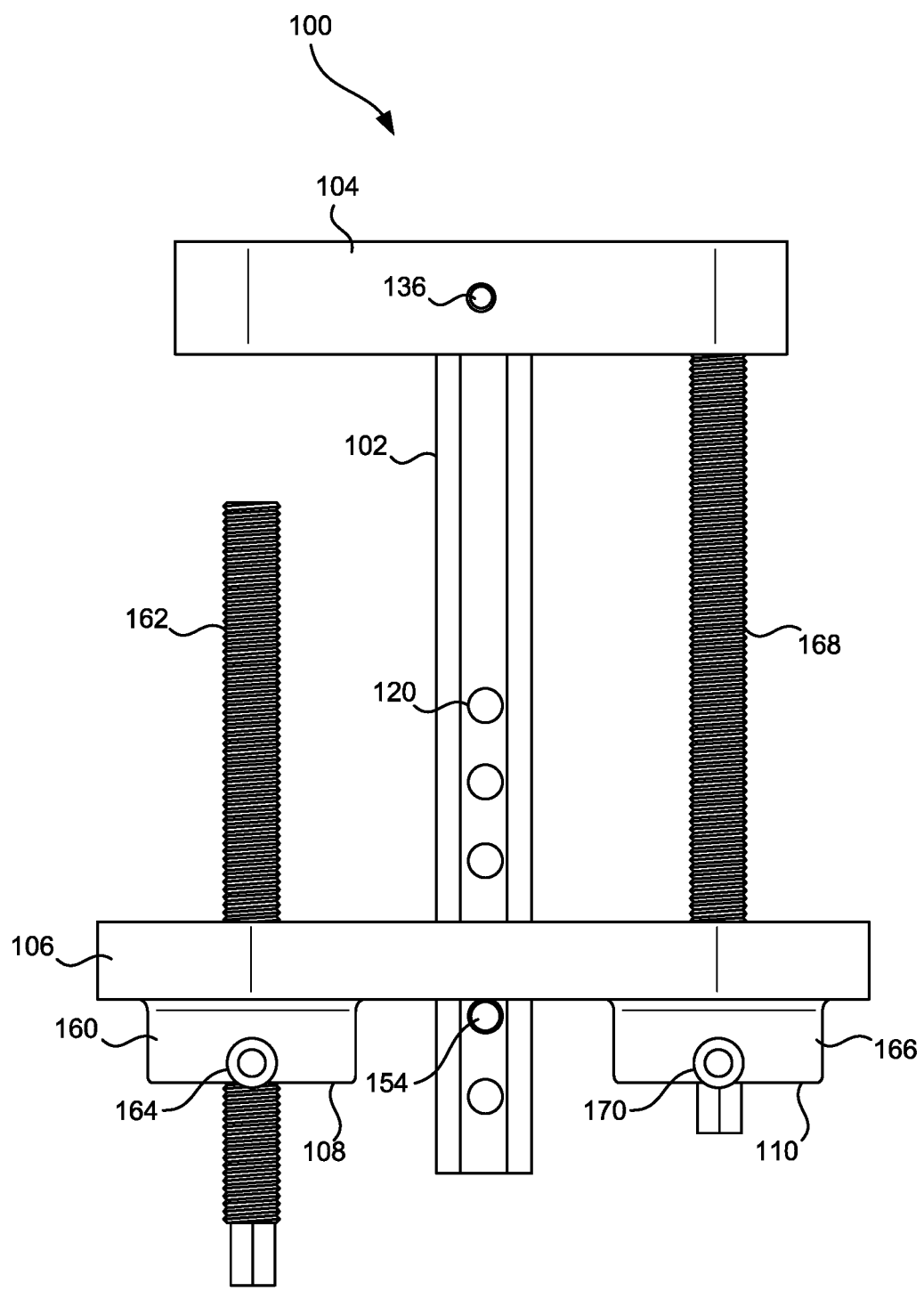
FIG. 1B is a first side view of the joint press of FIG. 1A.
Figure 1C:
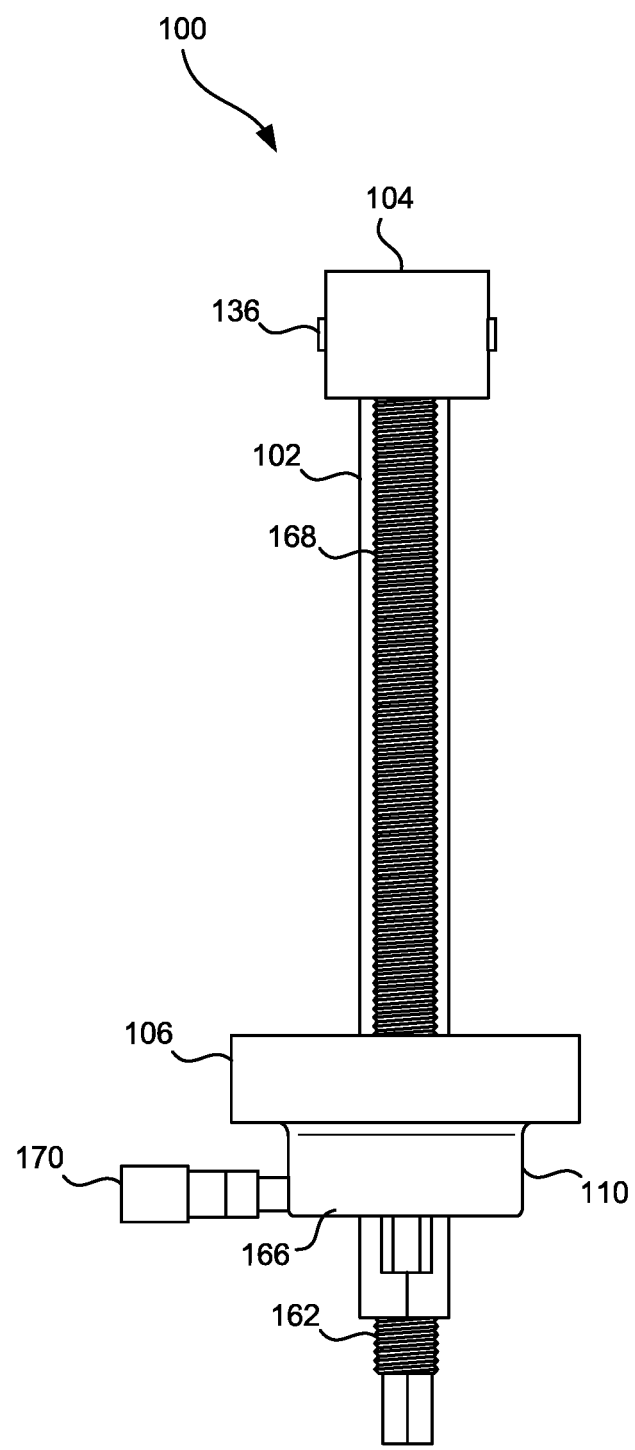
FIG. 1C is a second side view of the joint press of FIG. 1A.
Figure 2:
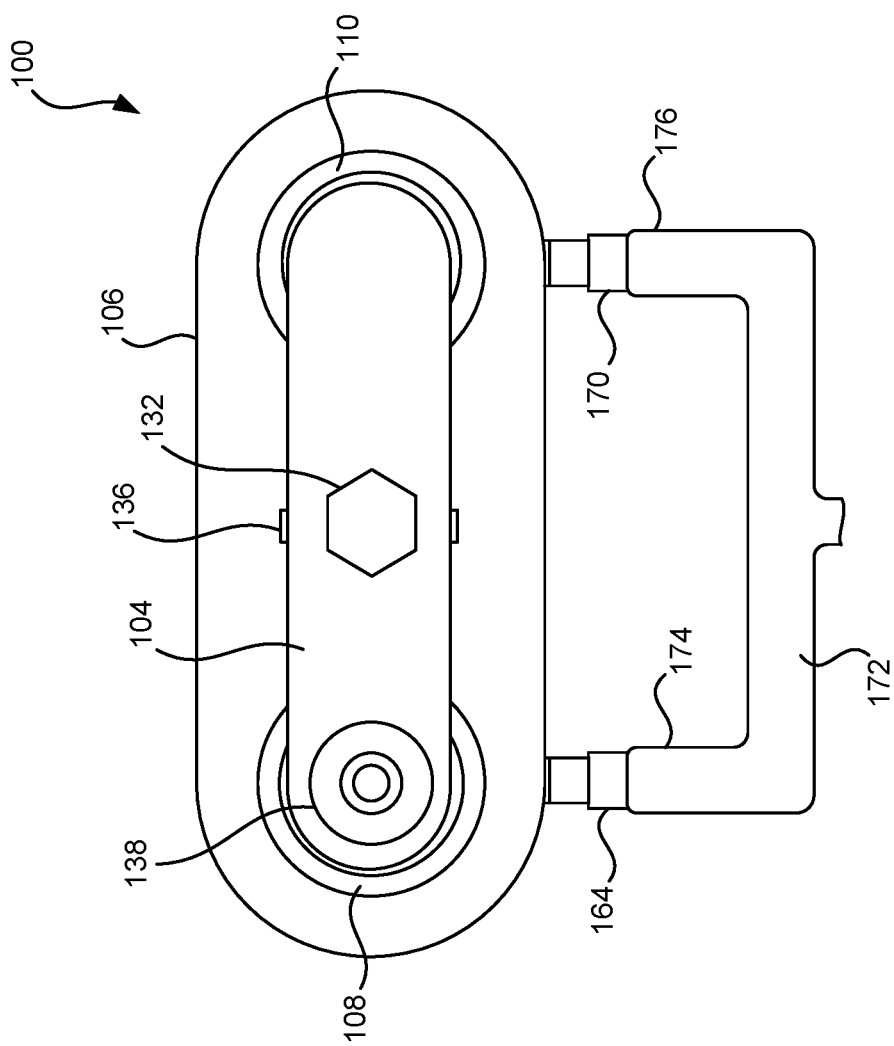
FIG. 2 is a first end view of the joint press of FIG. 1A with actuators coupled to a feed line, according to an embodiment of the present invention.
Figure 3A:
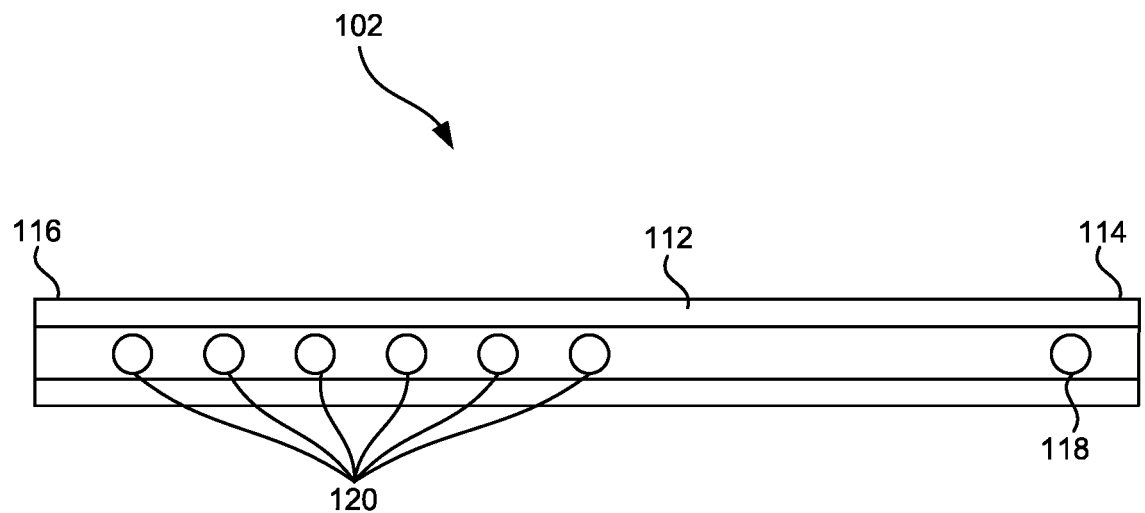
FIG. 3A is a first side view of a shaft of the joint press of FIG. 1A, according to an embodiment of the present invention.
Figure 3B:
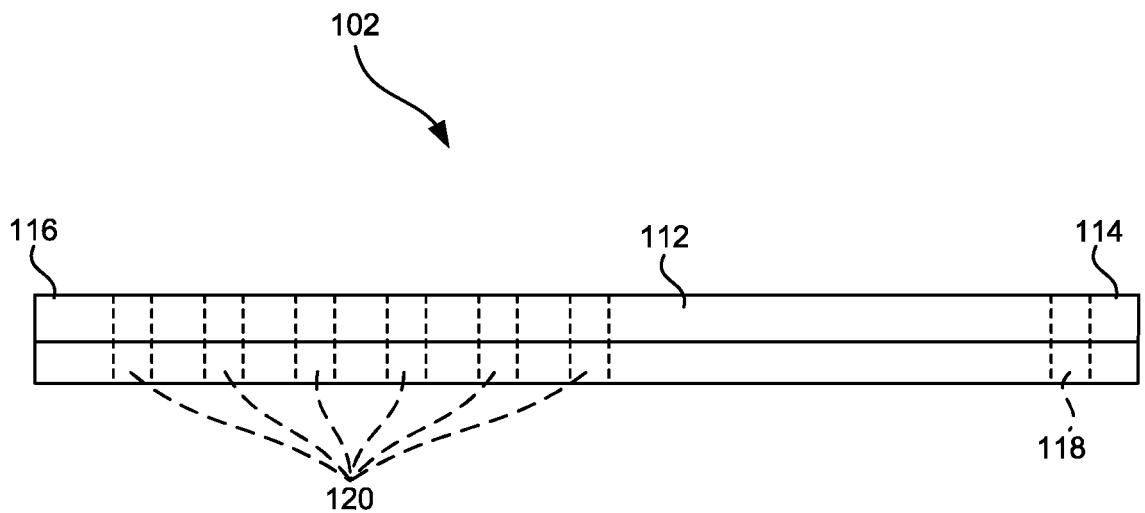
FIG. 3B is a second side view of the shaft of FIG. 3A.
Figure 4A:
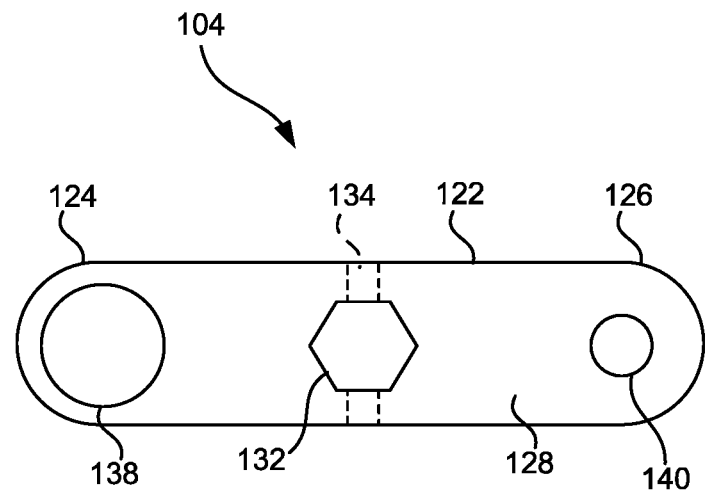
FIG. 4A is a first side view of a first frame portion of the joint press of FIG. 1A, according to an embodiment of the present invention.
Figure 4B:
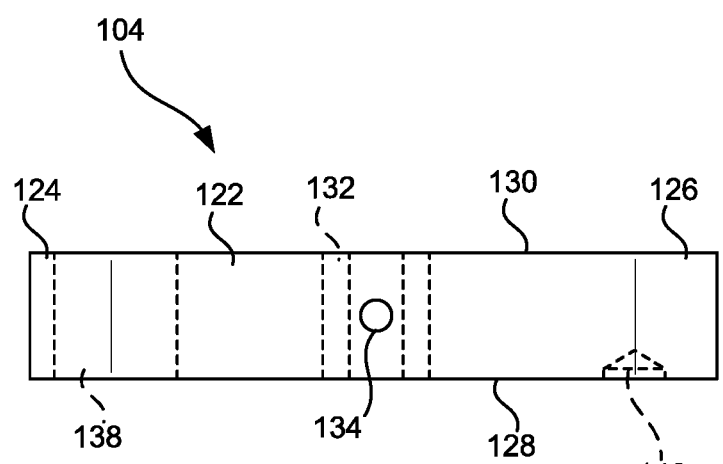
FIG. 4B is a second side view of the first frame portion of FIG. 4A.
Figure 5A:
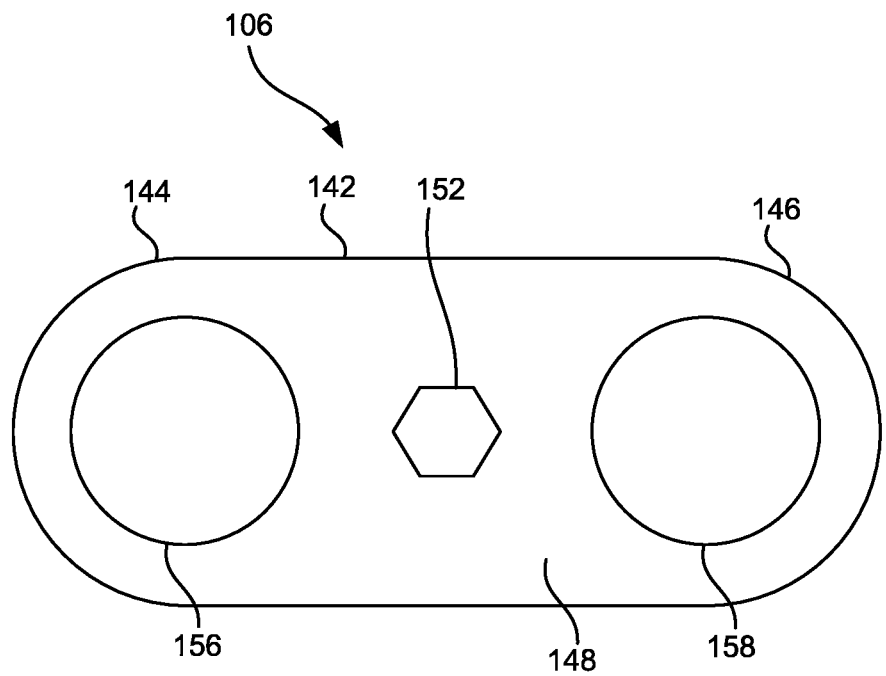
FIG. 5A is a first side view of a second frame portion of the joint press of FIG. 1A, according to an embodiment of the present invention.
Figure 5B:
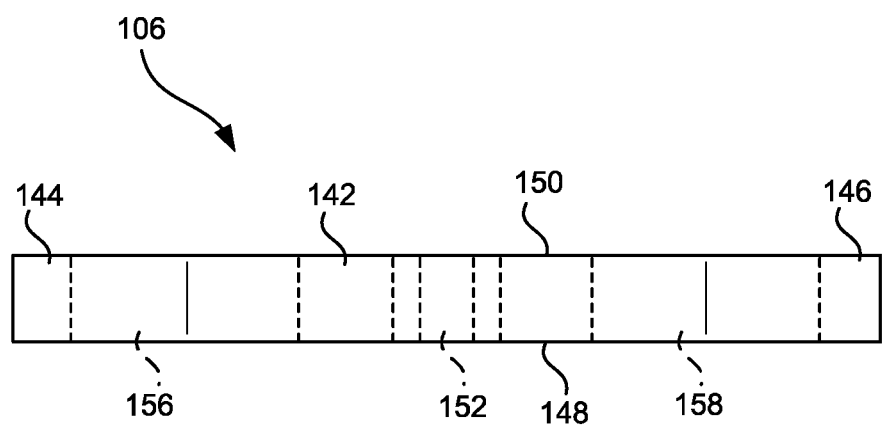
FIG. 5B is a second side view of the second frame portion of FIG. 5A.

Referring to FIGS. 1A-1C, a joint press 100, such as for removal and/or installation of ball joints or bushings from and/or into suspension components of vehicles, includes a spine or shaft 102 adapted to couple the first and second frame portions 104, 106 together, and first and second actuators 108, 110 coupled to the second frame portion 106. The first and second actuators 108, 110 are sized and spaced such that combined forces of the first and second actuators 108, 110 minimize a bending moment (and bending stress) about the shaft 102. The first and second actuators 108, 110 may also share a feed line (as shown in FIG. 2 and discussed in further detail below) that provides substantially equal pressure across each of the first and second actuators 108, 110. This reduces an axis of bending of the shaft 102, and causes the first and second frame portions 104, 106 to remain substantially parallel to one another during use.

Referring to FIGS. 1A-1C, 3A and 3B, the shaft 102 includes an elongated body 112 having opposing first and second shaft end portions 114, 116. A first shaft aperture 118 may be disposed in the shaft 102 proximal to the first shaft end portion 114. One or more second shaft apertures 120 may be disposed in the shaft 102 proximal to the second shaft end portion 116, and the second shaft apertures 120 may be spaced apart along the shaft from the second shaft end portion 116 in a directions towards the first shaft end portion 114. The second shaft apertures 120 allow for an adjustable throat length (i.e., distance between the first and second frame portions 104, 106) of the joint press 100. The shaft 102 may also have a hexagonal shaped cross section. However, in other embodiments, the shaft 102 may have other shaped cross sections, such as circular, oval, polygonal, etc.

Referring to FIGS. 1A-1C, 4A and 4B, the first frame portion 104 includes a first frame body 122 with first and second opposing first frame end portions 124, 126, and first and second opposing first frame sides 128, 130. A first frame aperture 132 may be disposed in the first frame portion 104 between the first and second opposing first frame end portions 124, 126. The first frame aperture 132 may extend between the first and second opposing first frame sides 128, 130, and be centrally located between the first and second opposing first frame end portions 124, 126. A pin aperture 134 may also be disposed in the first frame portion 104, and extend transversely through the first frame aperture 132.

During assembly, the first shaft end portion 114 is disposed in the first frame aperture 132 with the first shaft aperture 118 aligned with the pin aperture 134. A fastener 136 (shown in FIG. 1A) is disposed in the first shaft aperture 118 and pin aperture 134 to couple the first frame portion 104 and the shaft 102 together. In this regard, the first frame aperture 132 has a complimentary or corresponding cross sectional shape to that of the shaft 102. For example, the first frame aperture 132 may have a hexagonal shaped cross section. However, in other embodiments, the first frame aperture 132 may have other shaped cross sections corresponding to the shaft 102, such as circular, oval, polygonal, etc.

The first frame portion 104 also includes an adapter coupling aperture 138 and a blind hole or dead head 140, respectively disposed proximal to the first and second opposing first frame end portions 124, 126. The adapter coupling aperture 138 extends between the first and second opposing first frame sides 128, 130, and the blind hole or dead head 140 extends into the first frame sides 130. The adapter coupling aperture 138 is adapted to receive and or otherwise couple to a variety of cups and/or adapters that interface with various ball joint components. Example adapters may include those disclosed in U.S. Pat. No. 7,610,664, titled Joint Press Set, the disclosure of which is incorporated herein by reference in its entirety.

Referring to FIGS. 1A-1C, 5A and 5B, the second frame portion 106 includes a second frame body 142 with first and second opposing second frame end portions 144, 146, and first and second opposing second frame sides 148, 150. A second frame aperture 152 may be disposed in the second frame portion 106 between the first and second opposing second frame end portions 144, 146. The first frame aperture 152 may extend between the first and second opposing second frame sides 148, 150, and be centrally located between the first and second opposing second frame end portions 144, 146.

During assembly, the second shaft end portion 116 is disposed in the second frame aperture 152 with at least one of the second shaft apertures 120 position or disposed proximal to the second frame side 150. A fastener 154, such as a pin (shown in FIG. 1B) is disposed in the second shaft aperture 120 to couple the second frame portion 106 and the shaft 102 together. In this regard, the second frame aperture 152 has a complimentary or corresponding cross sectional shape to that of the shaft 102. For example, the second frame aperture 152 may have a hexagonal shaped cross section. However, in other embodiments, the second frame aperture 152 may have other shaped cross sections corresponding to the shaft 102, such as circular, oval, polygonal, etc. Additionally, a distance between the first and second frame portions 104, 106 may be adjusted by moving the second frame portion 106 along the shaft 102, and inserting the fastener 154 into the appropriate second shaft aperture 120.

The second frame portion 106 also includes first and second actuator coupling apertures 156, 158, respectively disposed proximal to the first and second opposing second frame end portions 144, 146. The first and second actuator coupling apertures 156, 158 are adapted to respectively receive or otherwise couple to the first and second actuators 108, 110. In an example, the first and second actuator coupling apertures 156, 158 are disposed a substantially equal distance from the first frame aperture 152 or shaft 102.

Referring to FIGS. 1A-1C, the first actuator 108 includes a first actuator assembly 160 with a first actuator shaft 162, and a first actuator inlet 164, and the second actuator 110 includes a second actuator assembly 166 with a second actuator shaft 168, and a second actuator inlet 170. In an example, the first and second actuators 108, 110 are hydraulic linear actuators, and are couples to a common feed line. For example, referring to FIG. 2, a feed line 172 may have a first and second outlet ends 174, 176, respectively coupled to the first and second actuator inlets 164, 170. The feed line 172 supplies hydraulic fluid to the first and second actuators 108, 110, and holds equal pressure across both of the first and second actuators 108, 110.

During use, the first and second actuators 108, 110 move the respective first and second actuator shafts 162, 168 linearly towards or away from the first frame portion 104. When moving linearly towards the first frame portion 104, the second actuator shaft 168 may engage the blind hole or dead head 140 of the first frame portion 104, while the first actuator 108 performs the work. In this regard, the adapter coupling aperture 138 and the first actuator shaft 162 are substantially axially aligned with each other, and the first actuator shaft 162 is adapted to receive and or otherwise couple to a variety of cups and/or adapters that interface with various ball joint components. As described above, example adapters may include those disclosed in U.S. Pat. No. 7,610,664, titled Joint Press Set, the disclosure of which is incorporated herein by reference in its entirety. Each of the first and second actuators 108, 110 may also have a length adjustment, such as a screw thread to facilitate use with different throat lengths or depth of ball joints/bushings.

By equalizing forces on opposing sides of the first and second frame portions 104, 106, the shaft 102 is only loaded in tension. This is accomplished by use of the first and second actuators 108, 110 of equal working area acting an equal distance from the shaft 102. For example, during use, once all the free travel has been taken up, pressure builds on the first and second actuators 108, 110. Because the first and second actuators 108, 110 share a common supply, pressure is equalized at all times between the first and second actuators 108, 110. As the shaft 102 is principally loaded in tension, a throat length of the joint press 100 is essentially unlimited. This also removes an axis of bending which assist in holding the first and second frame portions 104, 106 substantially parallel and the working force of the joint press 100 in line with an axis of motion needed to install or remove a ball joint.

Figure 6:
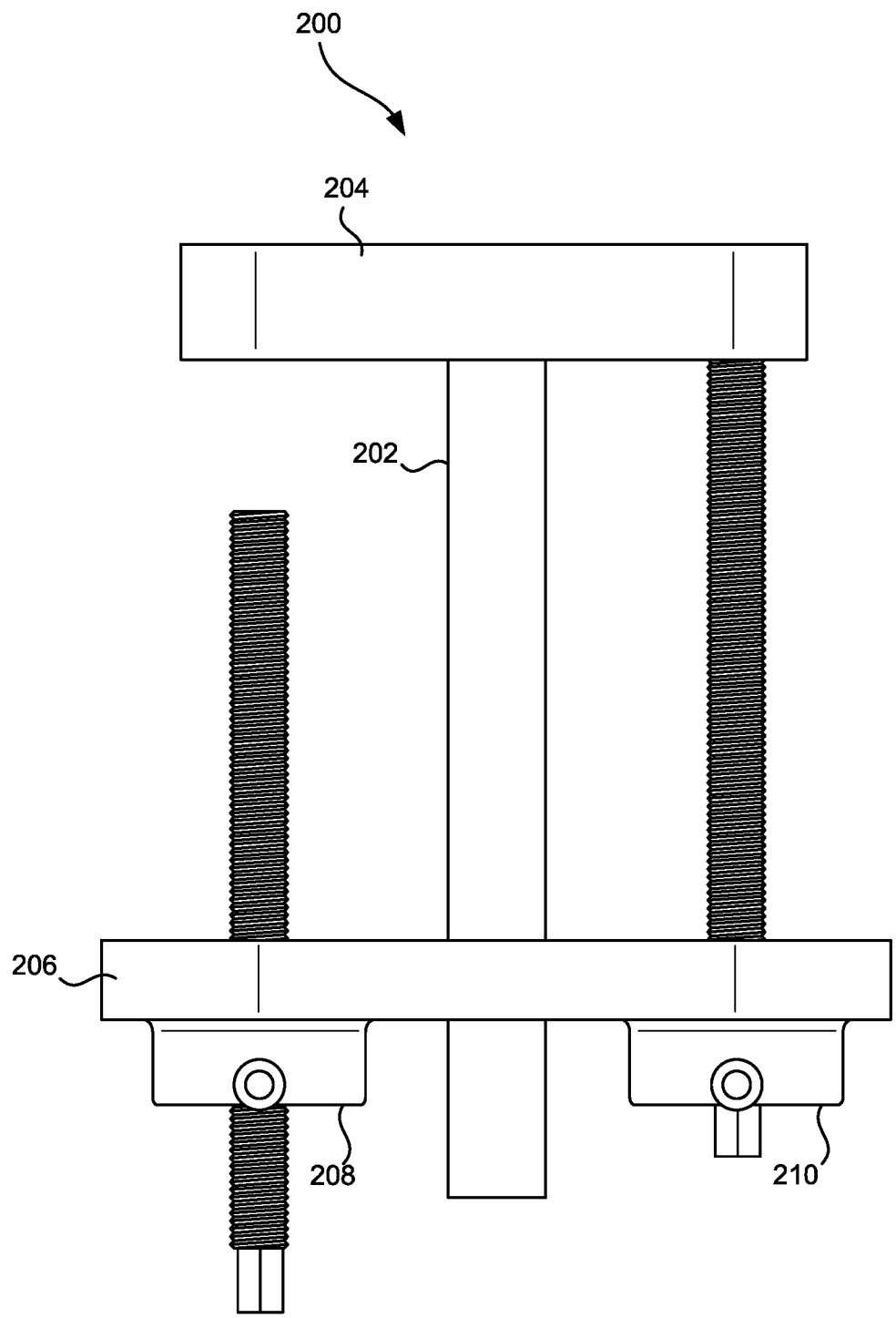
FIG. 6 is a perspective view of another joint press, according to an embodiment of the present invention.

While the joint press 100 is described as including modular components, the components (such as the first and second frame portions and shaft) may be integral. For example, referring to FIGS. 6 and 7, the shaft may be a separate piece or integral to one or both of the first and second frame portions. In the example shown in FIGS. 6 and 7, the joint press 200 is substantially the same as the joint press 100. For example, the joint press 200 includes a spine or shaft 202 adapted to couple first and second frame portions 204, 206 together, and first and second actuators 208, 210 coupled to the second frame portion 206. The first and second actuators 208, 210 may be the same as the first and second actuators 108, 110 described above to minimize a bending moment (and bending stress) about the shaft 202. The shaft 202, and first and second frame portions 204, 206 may also be essentially the same as the shaft 102, and first and second frame portions 104, 106 described above with the differences described below.

The shaft 202 may have a substantially circular cross sectional shape, and may be integral to one or both of the first and second frame portions 204, 206. The shaft 202 may also be fixed or include apertures (such as shaft apertures 120 described above) to allow for an adjustable throat length.

Figure 8A:
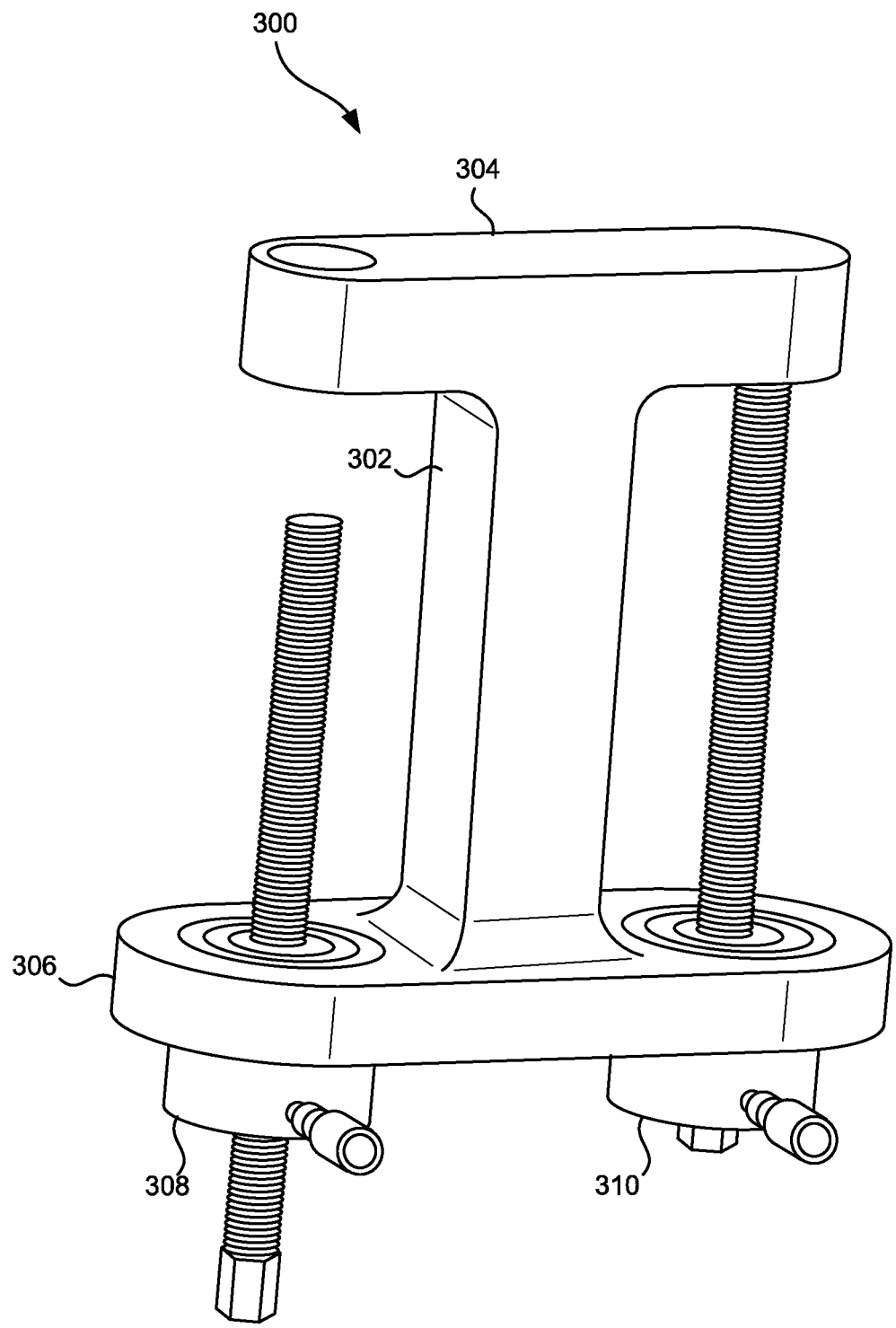
FIG. 8A is a perspective view of another joint press, according to an embodiment of the present invention.
Figure 8B:
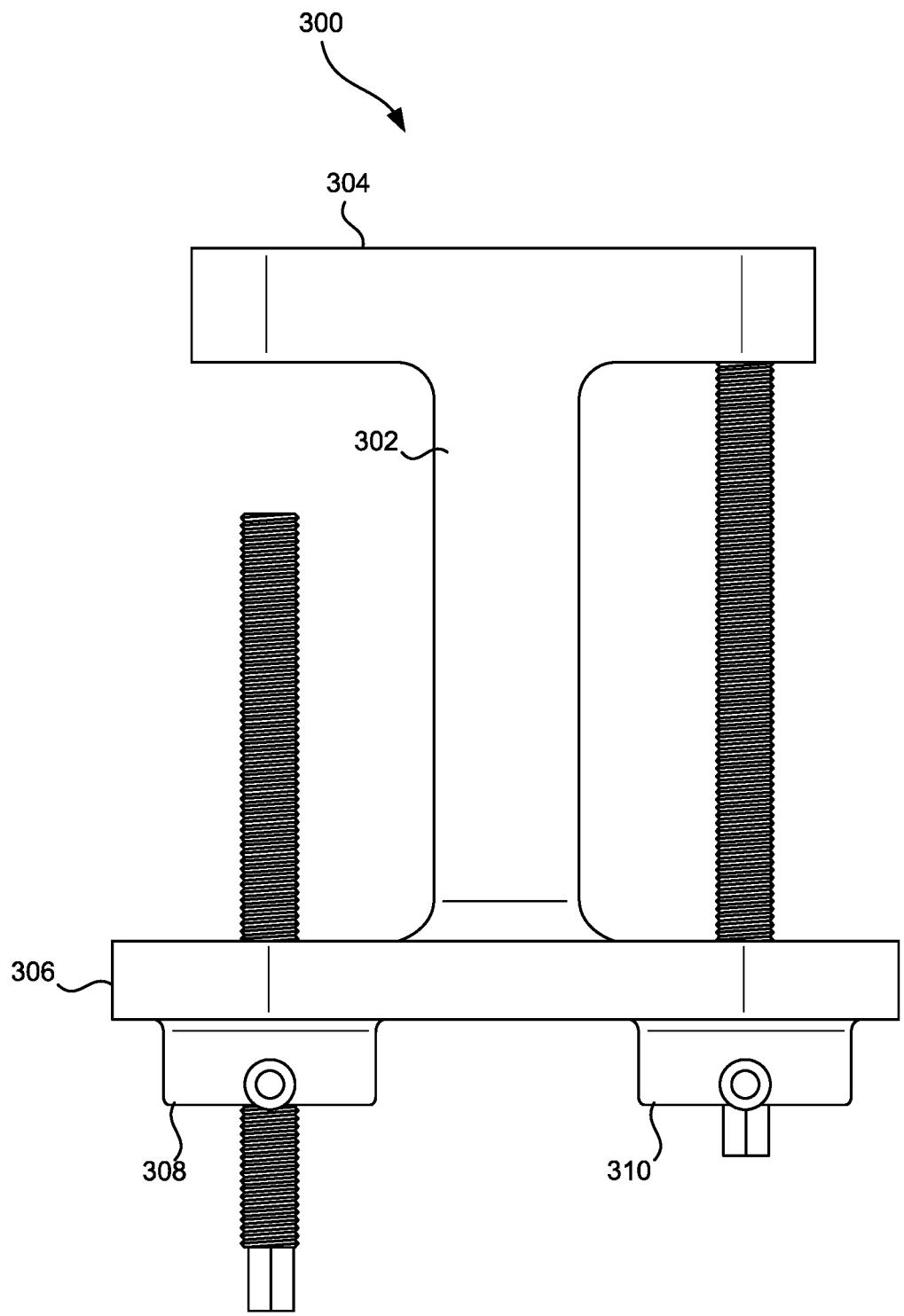
FIG. 8B is a side view of the joint press of FIG. 8A.

In another embodiment, referring to FIGS. 8A and 8B, the shaft and first and second frame portions may be a single integral piece. For example, the joint press 300 is substantially the same as the joint press 100. For example, the joint press 300 includes a spine or shaft 302 coupling first and second frame portions 304, 306 together, and first and second actuators 308, 310 coupled to the second frame portion 306. The first and second actuators 308, 310 may be the same as the first and second actuators 108, 110 described above to minimize a bending moment (and bending stress) about the shaft 302. The shaft 302, and first and second frame portions 304, 306 may also be essentially the same as the shaft 102, and first and second frame portions 104, 106 described above, except that the shaft 302, and first and second frame portions 304, 306 may be a fixed single integral piece.

In another embodiment, referring to FIGS. 9A-9E, the first and second actuators may integrated into the frame portion. For example, the joint press 400 is similar to the joint presses 100, 200, and 300. The joint press 400 includes a spine or shaft 402 coupling first and second frame portions 404, 406 together, first and second actuator shafts 462, 468, and first and second actuators 408, 410 integrated into the second frame portion 406. The shaft 402, first frame portion 404, and first and second actuator shafts 462, 468 may be essentially the same as the shaft 102, first frame portion 104, and first and second actuator shafts 162, 168; the shaft 202 and first frame portion 204; or the shaft 302 and first frame portion 304 described above. The second frame portion 406 may also be similar to the second frame portion 106, 206, or 306 described above, except that the first and second actuators 408, 410 are integrated into the second frame portion 406, and the joint press 400 includes a single actuator inlet 464 that couples to a feed line that supplies hydraulic fluid to the first and second actuators 408, 410, and holds equal pressure across both of the first and second actuators 408, 410.

Figure 9A:
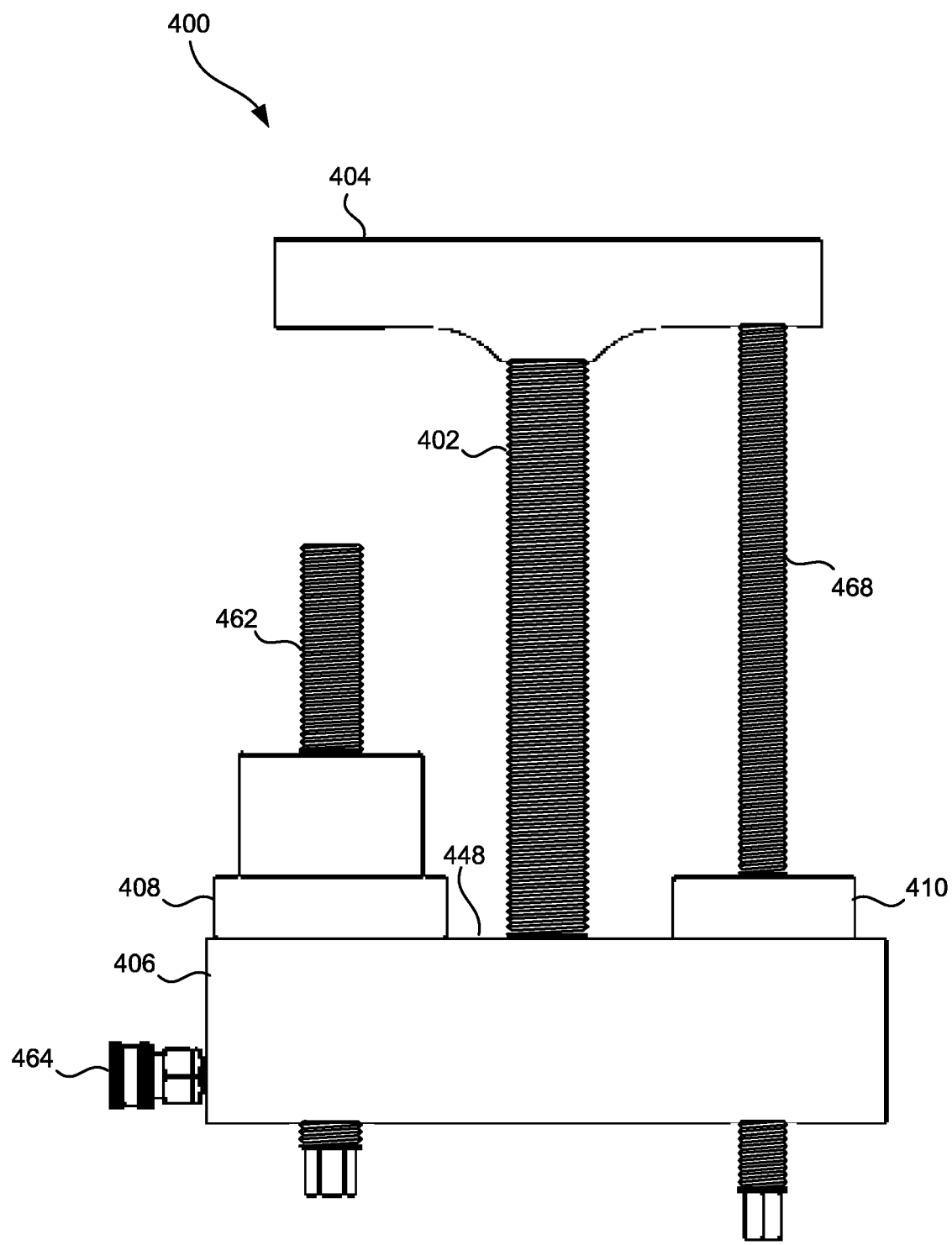
FIG. 9A is a first side view of another joint press, according to an embodiment of the present invention.
Figure 9B:
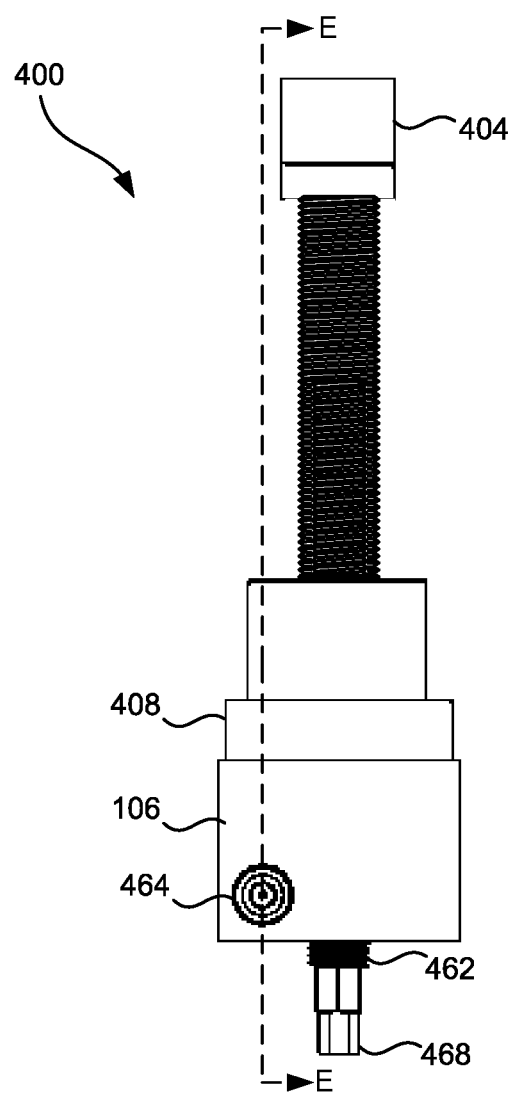
FIG. 9B is a second side view of the joint press of FIG. 9A.
Figure 9C:
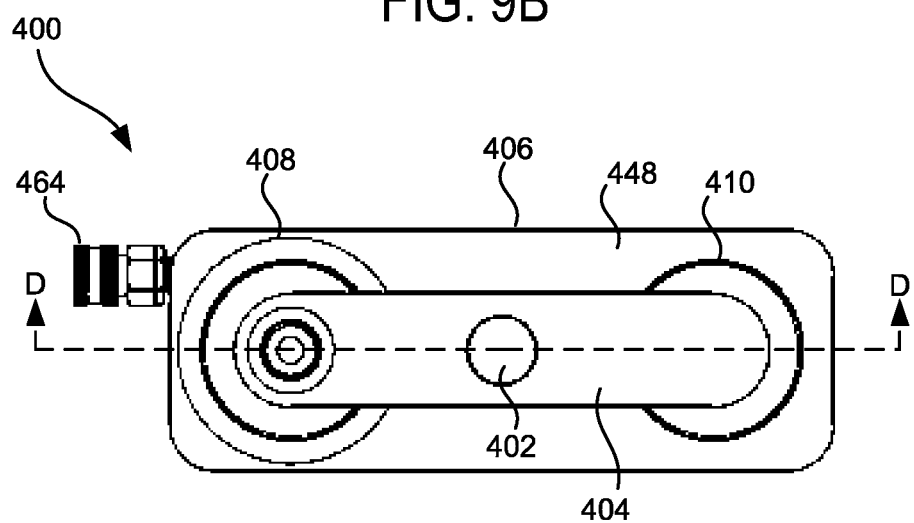
FIG. 9C is an elevation view of the joint press of FIG. 9A.
Figure 9D:
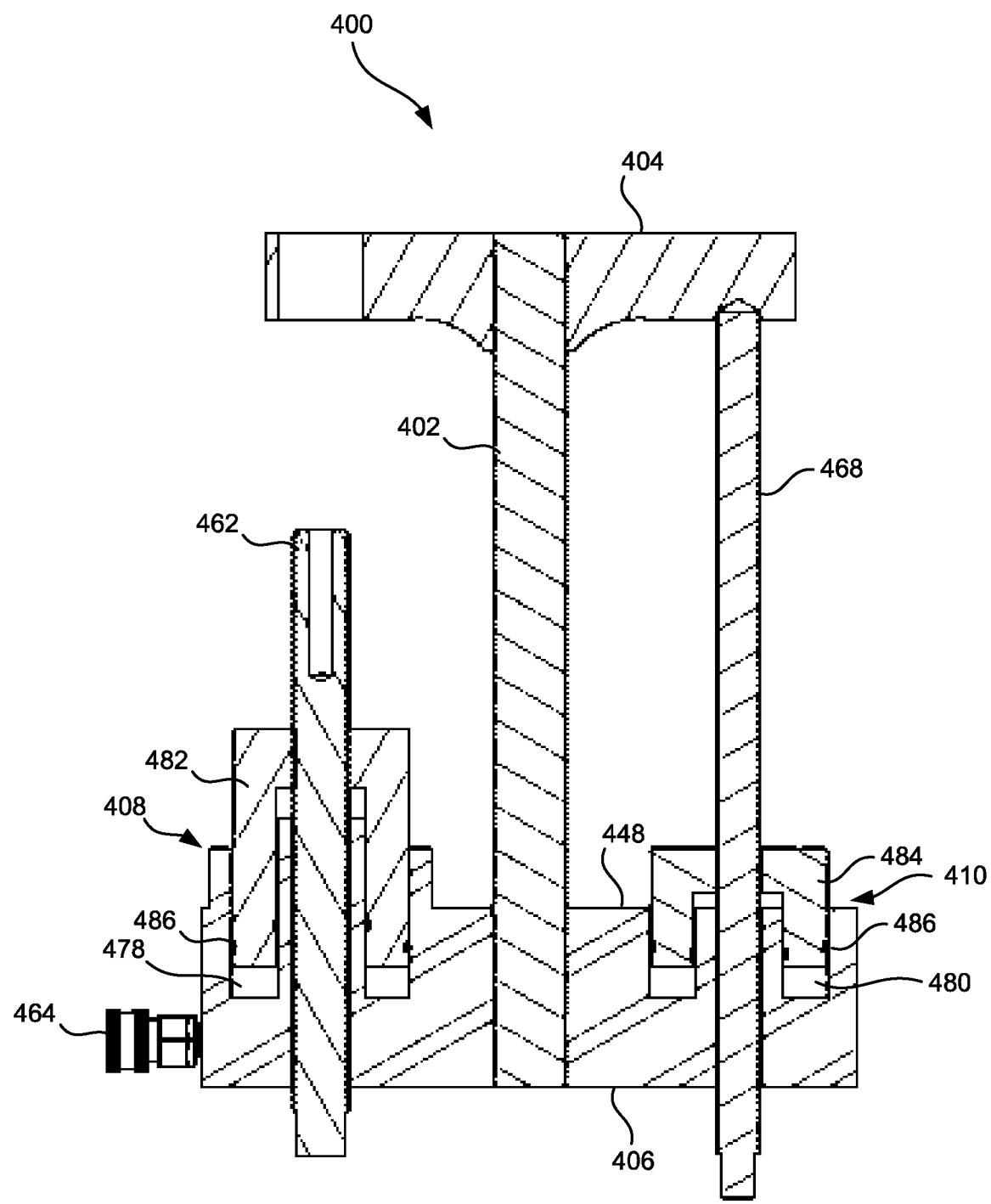
FIG. 9D is a sectional view of the joint press of FIG. 9C taken along line D-D.

In this embodiment, the second frame portion 406 includes a first frame side 448 that faces in a direction towards the first frame portion 404. Referring to FIG. 9D, first and second piston sleeves or piston recesses 478, 480 and first and second pistons 482, 484 may form the respective first and second actuators 408, 410. The first and second piston sleeves or piston recesses 478, 480 may be disposed in the second frame portion 406 that extend into the second frame portion 406 from the first frame side 448. The first and second pistons 482, 484 may be respectively disposed in the first and second piston sleeves 478, 480 such that the first and second pistons 482, 484 of the respective first and second actuators 408, 410 seal (via one or more seals 486, such as O-rings or other types of seals) with the respective first and second piston sleeves 478, 480 to create a high pressure cavity to create a working force on the first and second pistons 482, 484. The first and second pistons 482, 484 are sized and spaced such that a sum of the moments about the shaft 402 are approximately zero. In this embodiment, the first and second pistons 482, 484 may be equally spaced from the shaft 402 with equal working area. The first and second pistons 482, 484 may also be coupled to the respective first and second actuator shafts 462, 468, such that movement of the respective piston cause movement of the respective actuator shaft.

Figure 9E:
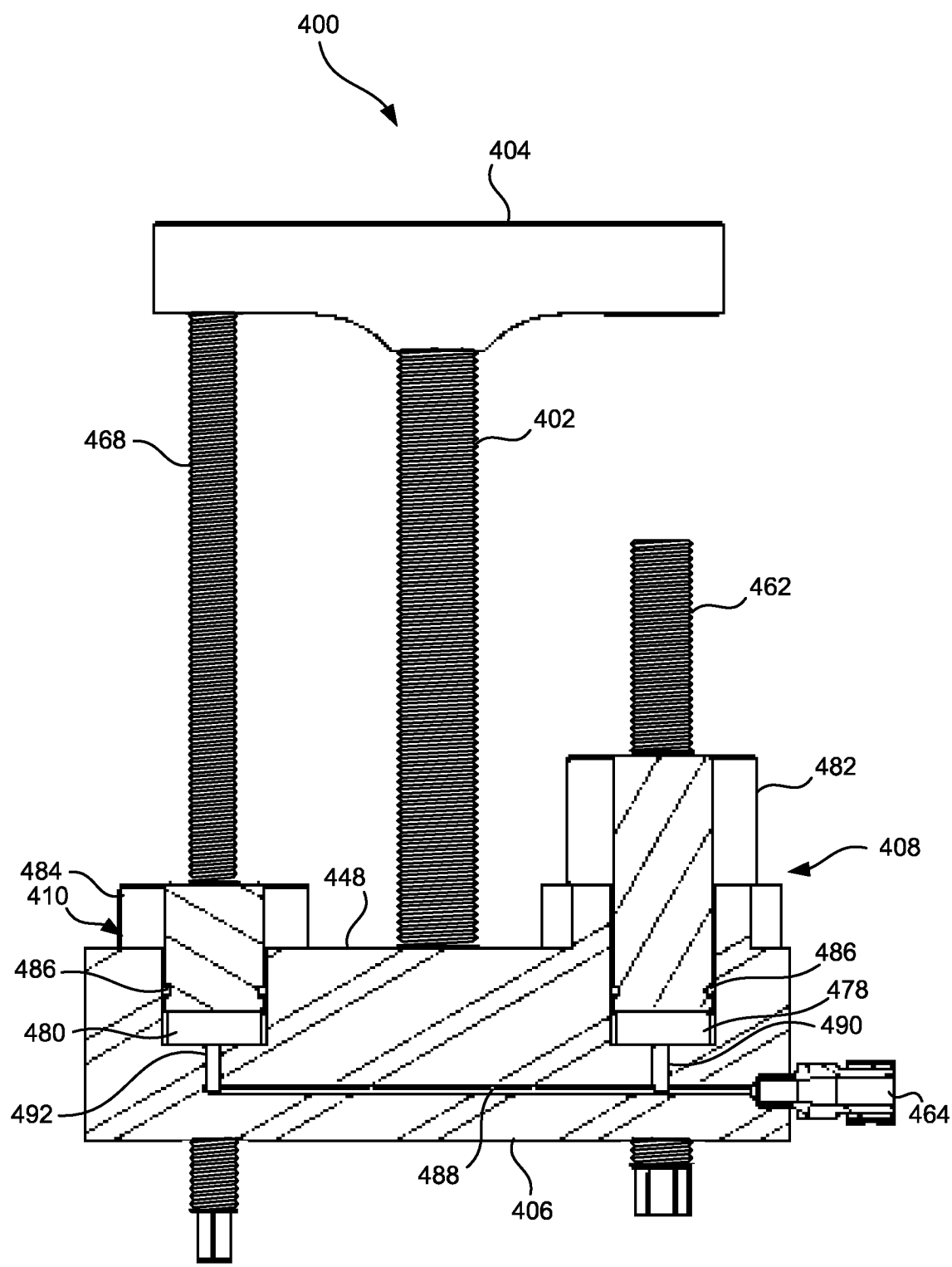
FIG. 9E is a sectional view of the joint press of FIG. 9B taken along line E-E.

Referring to FIG. 9E, the actuator inlet 464 may be internally ported through the second frame portion 406 (via channel 488) to the high pressure cavities for the working fluid through respective first and second ports 490 and 492 that lead into the respective first and second piston sleeves 478, 480. By sharing an actuator inlet 464, the first and second actuators 408, 410 receive substantially equal pressure across both actuators. By equalizing forces and pressure, the shaft 402 is loaded in tension. This also reduces an axis of bending of the shaft 402, and causes the first and second frame portions 404, 406 to remain substantially parallel and the force in line with an axis of motion to install or remove a ball joint.

It should also be appreciated that the actuators 108, 110; 208, 210, and/or 308, 310 may be integrated into the respective second frame portion 106, 206 306 in a similar manner as that of the second frame portion 406. Further, any feature of the various embodiments can be modified or incorporated into any of the other embodiments.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A joint press, comprising:
   a shaft having opposing first and second end portions;
   first and second frame portions respectively coupled to the first and second end portions, wherein the first frame portion includes an adapter coupling aperture adapted to receive a first adapter; and
   first and second actuators coupled to the second frame portion, wherein the first actuator includes a first actuator shaft adapted to couple to a second adapter, and the adapter coupling aperture and the first actuator shaft are substantially axially aligned with each other.

2. The joint press of claim 1, wherein the first and second actuators are disposed a substantially equal distance away from the shaft.

3. The joint press of claim 1, wherein the shaft includes shaft apertures, and the second frame portion is coupled to the shaft via a fastener disposed in one of the shaft apertures.

4. The joint press of claim 1, wherein each of the first and second actuators includes a hydraulic linear actuator.

5. The joint press of claim 1, wherein the shaft and the first and second frame portions are a single integral component.

6. The joint press of claim 1, wherein each of the first and second actuators is coupled to a common feed line.

7. The joint press of claim 1, wherein each of the first and second actuators is coupled to the second frame portion by integrating the first and second actuators into the second frame portion.

8. The joint press of claim 7, further comprising a first piston recess disposed in the second frame portion and a first piston disposed in the first piston recess to form the first actuator.

9. The joint press of claim 8, wherein each of the first and second actuators is coupled to a common actuator inlet port extending into the second frame portion.

10. A joint press, comprising:
    a shaft having opposing first and second end portions;
    a first frame portion coupled to the first end portion, and including an adapter coupling aperture adapted to couple to a first adapter;
    a second frame portion coupled to the second end portion; and
    first and second actuators coupled to the second frame portion, and disposed an equal distance away from the shaft, wherein the first and second actuators respectively include first and second actuator shafts, and the first actuator shaft is adapted to couple to a second adapter and is substantially axially aligned with the adapter coupling aperture.

11. The joint press of claim 10, wherein the second actuator shaft is adapted to engage the first frame portion during use.

12. The joint press of claim 10, wherein the shaft includes shaft apertures, and the second frame portion is coupled to the shaft via a fastener disposed in one of the shaft apertures.

13. The joint press of claim 10, wherein each of the first and second actuators is a hydraulic linear actuator.

14. The joint press of claim 10, wherein the shaft and the first and second frame portions are a single integral piece.

15. The joint press of claim 10, wherein each of the first and second actuators is coupled to a common feed line.

16. The joint press of claim 10, wherein each of the first and second actuators is coupled to the second frame portion by integrating the first and second actuators into the second frame portion.

17. The joint press of claim 16, further comprising a first piston recess disposed in the second frame portion and a first piston disposed in the first piston recess to form the first actuator.

18. A joint press, comprising:
    a shaft having opposing first and second end portions;
    first and second frame portions respectively coupled to the first and second end portions; and
    first and second actuators coupled to the second frame portion, wherein each of the first and second actuators is coupled to a common actuator inlet port extending into the second frame portion, and the first actuator includes a first piston recess disposed in the second frame portion and a first piston disposed in the first piston recess.

19. The joint press of claim 18, wherein the first and second actuators are disposed a substantially equal distance away from the shaft.

20. The joint press of claim 18, wherein the shaft includes shaft apertures, and the second frame portion is coupled to the shaft via a fastener disposed in one of the shaft apertures.

21. The joint press of claim 18, wherein the shaft and the first and second frame portions are a single integral component.

* * * * *